United States Patent
Guillemette

[11] Patent Number: 6,135,750
[45] Date of Patent: Oct. 24, 2000

[54] CIRCUMFERENTIAL BALANCED FLOW PASSAGE

[76] Inventor: A. Roger Guillemette, 10 Pike St., West Warwick, R.I. 02893

[21] Appl. No.: 09/182,328

[22] Filed: Oct. 29, 1998

Related U.S. Application Data

[63] Continuation-in-part of application No. 08/998,401, Dec. 24, 1997, abandoned, which is a continuation of application No. 08/566,995, Dec. 4, 1995, Pat. No. 5,780,066.

[51] Int. Cl.[7] .................................................. B29C 47/22
[52] U.S. Cl. ......................... 425/113; 425/381; 425/466; 425/467
[58] Field of Search ................................ 425/113, 133.1, 425/380, 387, 466, 467

[56] References Cited

U.S. PATENT DOCUMENTS

| | | | |
|---|---|---|---|
| 3,947,173 | 3/1976 | Dougherty | 425/113 |
| 4,365,949 | 12/1982 | Nash | 425/466 |
| 4,548,569 | 10/1985 | Pitigliano et al. | 425/133.1 |
| 5,183,669 | 2/1993 | Guillemette | 425/113 |
| 5,667,818 | 9/1997 | Guillemette | 425/133.1 |
| 5,780,066 | 7/1998 | Guillemette | 425/113 |

*Primary Examiner*—Harold Pyon
*Assistant Examiner*—Joseph Leyson
*Attorney, Agent, or Firm*—Perman & Green, LLP

[57] ABSTRACT

A diverter element is constructed of a generally cylindrical shape for insertion in an open cylindrical bore. A balanced flow passage is formed by the cooperation of grooves constructed on the outer surface of the diverter and the inner surface of the bore. A distribution groove is constructed in the diverter extending circumferentially about the diverter surface. First and second pairs of diverging grooves are constructed downstream of the distribution groove. The diverging grooves are separated by a dam which is shaped to restrict flow at the point of divergence of the grooves to encourage the plastic flow to divide and fill the diverging grooves while allowing reduced flow over the dam.

5 Claims, 2 Drawing Sheets

CIRCUMFERENTIAL BALANCED FLOW PASSAGE

This is a continuation in part application of U.S. application for patent Ser. No. 08/998,401, filed Dec. 24, 1997, now abandoned, which is a continuation of U.S. application for patent Ser. No. 08/566,995, filed Dec. 4, 1995, now U.S. Pat. No. 5,780,066, the contents of which is incorporated herein by reference.

One of the primary goals of a die head for extruding plastic is to deliver molten plastic to the extrusion passage in a balanced, evenly distributed flow. The extrusion passage of this application is generally for the purpose of extruding a layer of plastic on a wire or other cylindrical substrate. Such layers need to be evenly distributed about the circumference of the wire or substrate, otherwise, an uneven layer might result and the end product may fail. Extrusion passages used for this purpose are generally annular in shape and tapered from a large diameter to a smaller diameter circular opening. This results in an extrusion passage of a conical shape. The die head is designed to deliver molten plastic from an extruder to the annular passage.

One attempt to obtain a balanced flow is shown in U.S. Pat. No. 5,183,669 which issued on Feb. 2, 1993. In the '669 patent a diverter is designed to provide a distribution of the flow circumferentially about the surface of the diverter. A groove 50 is formed to control the flow of plastic around the diverter and towards the extrusion passage at 44. Although this design functions adequately, it is less advantageous where the size of the product is larger and the materials used are of relatively low viscosity. It is a purpose of this invention to provide an effective balanced flow passage even for larger dimensioned applications which use thicker consistency materials.

Another design which has successfully provided a balanced flow is the die head described in U.S. Pat. No. 5,667,818. In this patent a flow passage is described which uses a pair of distribution channels to receive the plastic flow from the extruder and divide it into two separate passages extending to opposite sides of the die head. A distribution groove is constructed in a face of a component which extends transverse to the direction of flow. The grooves are structured to receive and direct the flow to the extrusion channel in a balanced manner.

The parent of this application describes yet another design which uses a pair of distribution channels to feed a groove which is constructed circumferentially about the entrance of the extrusion channel. It is a purpose of this application to provide a extrusion die head which provides a balanced flow in a diverter type of structure which relies on circumferential movement of the plastic about the surface of the diverter.

SUMMARY OF THE INVENTION

The die head of this invention is generally described as a cross head die in that it receives molten plastic from an extruder transverse to the longitudinal axis of the die head. The plastic must then be turned to flow axially towards an annular tapered extrusion channel. The extrusion channel surrounds an axially extending passage through which a wire or tubular product may be directed to receive a cylindrical layer from the extrusion passage.

A diverter element is constructed of a generally cylindrical shape for insertion in an open cylindrical bore formed in the body of the die head. At its downstream end the interior surface of the bore is tapered inward towards its axis to provide a tapered conical outer wall of the extrusion passage. This surface mates with a similarly tapered surface on the diverter element to form the tapered extrusion channel. Upstream of the extrusion channel, there is constructed an opening in the die body to receive molten plastic and direct it radially inward to the interior bore.

A balanced flow passage is formed by the cooperation of grooves constructed on the outer surface of the diverter and the inner surface of the bore. To accomplish this a distribution groove is constructed in the diverter extending circumferentially about the diverter surface for approximately 180°. The distribution groove is positioned to align with the opening in the bore to receive flowing plastic at the midpoint of the groove and direct the flow of plastic circumferentially to either side of the diverter.

First and second pairs of diverging grooves are constructed downstream of the distribution groove and are connected on both sides with the downstream ends of the distribution groove to receive flowing plastic therefrom. The diverging grooves are separated by a dam which is shaped to restrict flow at the point of divergence of the grooves to encourage the plastic flow to divide and fill the diverging grooves while allowing reduced flow over the dam. In this manner an evenly balanced flow is distributed to the annular extrusion channel.

DESCRIPTION OF THE DRAWING

The invention of this application is described in more detail below with reference to the Drawing in which.

DESCRIPTION OF THE PREFERRED EMBODIMENT

Figure 4:
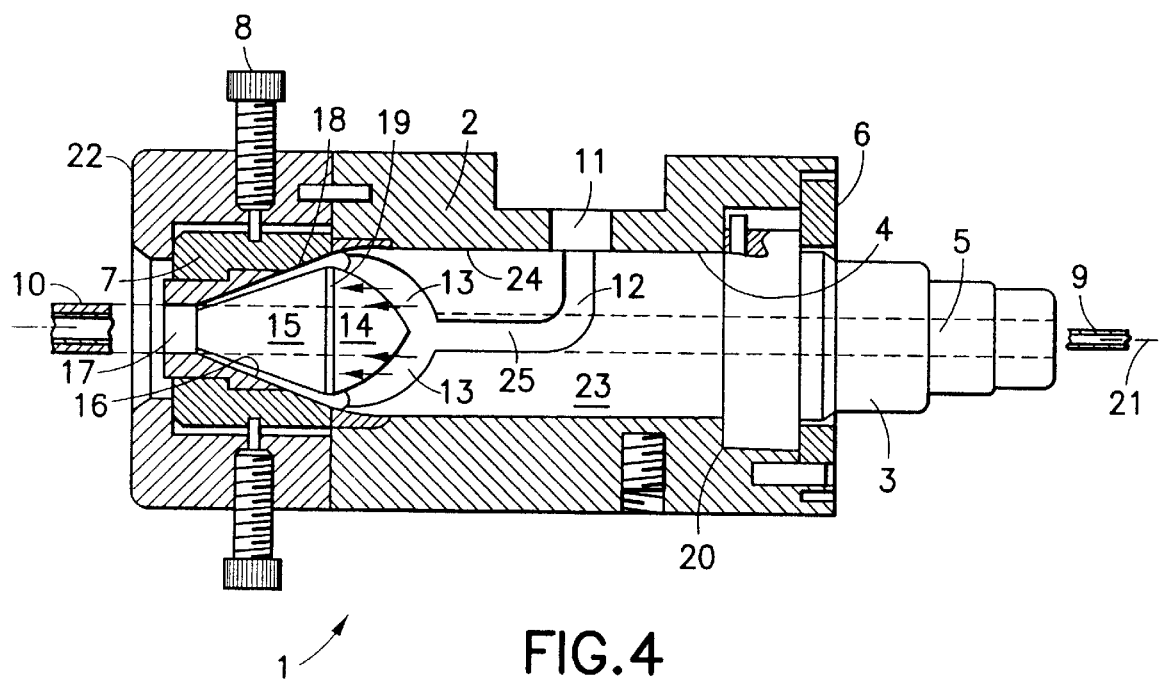
FIG. 4 is a sectional view of the extrusion die body exposing the diverter element of this invention.

An extrusion die head 1, constructed in accordance with the subject invention, is shown in FIG. 4. The die head 1 receives plastic from an extruder (not shown) and supplies it to a tapered annular extrusion channel 18 where it is extruded and applied to a wire 9. The general function of the die head 1 is to receive plastic at upstream inlet 11 and distribute it to downstream outlet 17 in a flow pattern that is evenly dispersed about the extrusion channel 18.

The die head 1 consists of a substantially cylindrical body 2 through which is constructed an axial extending open bore 4. A diverter element 3 is also of substantially cylindrical shape and fits within the bore 4. The diverter 3 may be secured within the bore 4 by means of a threaded cap 6 which forces the diverter 3 into engagement with the wall of the bore 4 at shoulder 20. A passage 5 is constructed in the diverter 3 and extends axially through the element 3 to provide a means for passing a work piece through the die for coating. The work piece may be a wire 9 which passes through the passage 5 to receive a layer 10 at the exit 17 of the die head 1.

In accordance with this invention, a balanced flow passage is formed by the cooperation of the outer surface 23 of the diverter 3 and the inner surface 24 of the bore 4. To accomplish this, an opening 11 is constructed in the die body 2 to allow the flow of molten plastic from an extruder into the bore 3. A distribution groove 12 is formed on the diverter 3 in a position in which the groove 12 aligns with the opening 11 to receive flowing plastic. The groove 12 extends circumferentially around the diverter element 3 for about 180°. At its downstream end 25, it turns parallel to the axis 21 of the extrusion die 1 and merges with further grooves 13. The groove 12 is constructed with a cross section of generally semi-circular or similar arcuate shape.

A die 7 is constructed to fit within the bore 4 at the downstream end 22 of die body 2 and forms the exit 17 of the extrusion passage. As shown in FIG. 4, the die 7 may be supported on adjustment screws 8. The extrusion passage 18 is formed by the cooperation between the tapered surface 15 formed at the downstream end of the diverter 3 and the mating surface 16 constructed on the inner surface of die 7. A clearance is provided between the two mating parts to form the passage 18. In this embodiment, the passage 18 is generally of conical configuration, as shown in FIG. 4. The entrance 19 to the passage 18 is formed by a cylindrical flat formed on the diverter 3.

Figure 1:
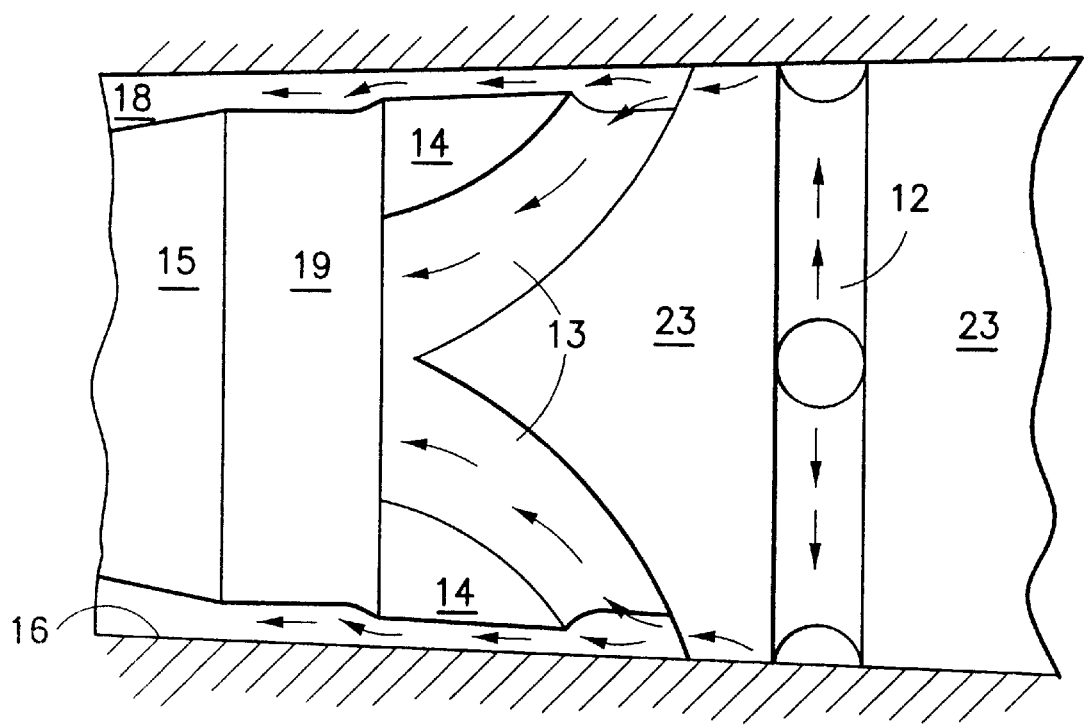
FIG. 1 is a top view of the diverter element of this invention.
Figure 2:
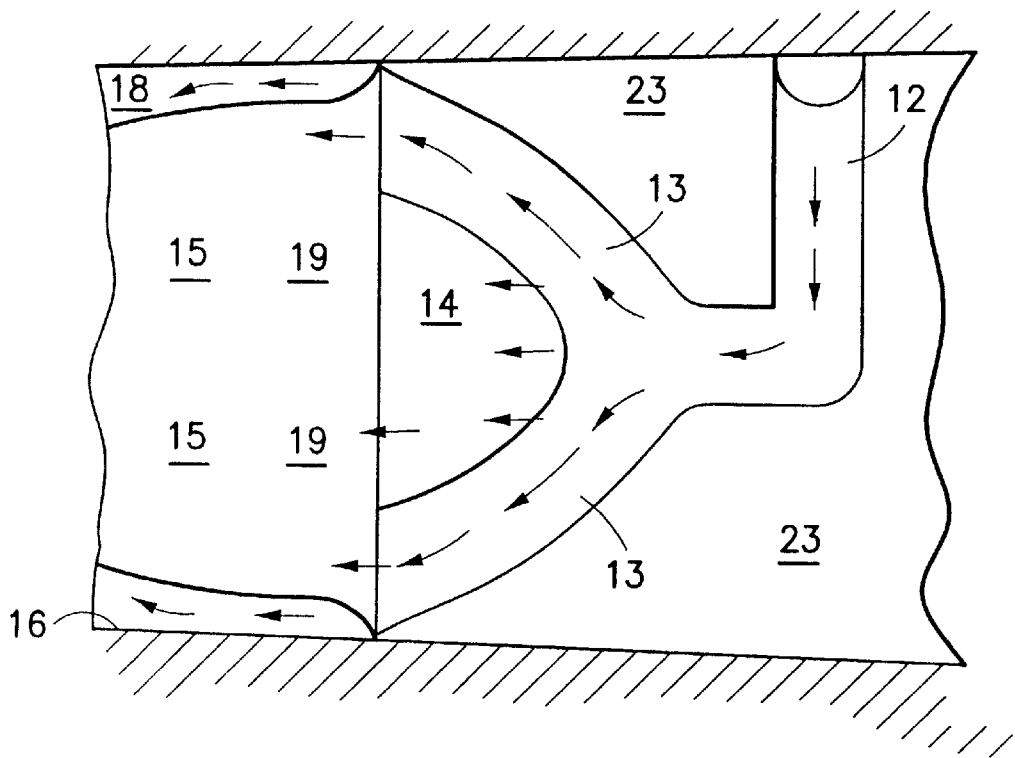
FIG. 2 is a side view of the diverter element of this invention.
Figure 3:
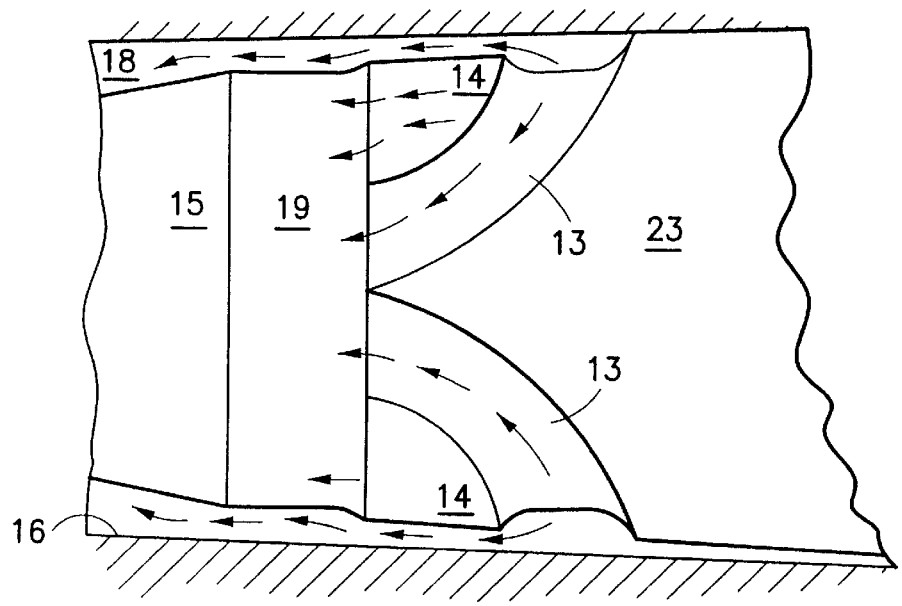
FIG. 3 is a bottom view of the diverter element of this invention.

In the majority of locations, the outer surface 23 of the diverter 3 is sized to fit closely in the bore 4, mechanically cooperating with the inner surface 24 of the bore 4 to seal the area of engagement from plastic flow. To form a balanced flow passage, the surface 23 is constructed with grooves or cylindrical flats to provide a clearance between the surfaces 23 and 24, thereby allowing plastic to flow therein. On either side of the diverter 3, there is constructed a pair of diverging grooves 13 generally having a cross section similar to distribution groove 12. The pair of grooves 13 communicate with the downstream end 25 of the distribution groove 12 to receive plastic and carry it downstream to the entrance 19 of the extrusion passage 18. As shown in FIGS. 1–3, entrance 19 of the extrusion channel 18 is formed as an annular groove encircling the full circumference of the diverter 3. As shown in all of the figures, the pair of grooves 13 diverge at an angle substantially at the point where they merge with the distribution groove 12. To accomplish this, a dam 14 is constructed at the downstream end 25 of the distribution groove 12. The grooves 13 become progressively separated by the dam 14 which is constructed to distribute the flow of plastic between grooves 13 and control the flow of plastic over the dam 14. By constructing a reduced clearance over the dam 14, the plastic is restricted and tends to flow in the easier path formed by the grooves 13. In this manner the dam 14 acts as a flow divider and a flow controller and promotes a balanced distribution of plastic to the entrance 19 of the extrusion channel 18.

In operation molten plastic is supplied from an extruder to the inlet 11 in die body 2 and enters bore 4. The plastic is distributed to either side of diverter 3 by the distribution groove 12. At the outlet 25 of groove 3, the plastic encounters dam 14 and separates into diverging grooves 13. A portion of the plastic is allowed to flow over the dam 14 at a restricted rate to insure an even distribution of plastic to the entrance 19 of conical extrusion channel 18. It has been found that this configuration works favorably in large diameter dies and in where low viscosity plastics are used.

I claim:

1. An extrusion die assembly constructed to process a stream of flowing plastic from an upstream inlet to a downstream outlet, said inlet and outlet being displaced longitudinally along the axis of said assembly and comprising:
    a die body having an axial extending open bore and an inlet constructed in the die body for receiving flowing plastic;
    a diverter positioned within the open bore in a generally close fit wherein the inner surface of the bore engages the outer surface of the diverter in a sealed relation;
    a passage, formed by the cooperation of the surfaces of the bore and diverter, for distributing the flow of plastic from the die body inlet to the extrusion die outlet, said passage comprising:
        a first groove constructed in the outer surface of the diverter in a position aligned with the die body inlet to receive flowing plastic therefrom at the midpoint of said first groove, said first groove extending at least partially circumferentially around said surface to distribute flowing plastic symmetrically to both sides of the diverter;
        a pair of second grooves constructed in the outer surface of the diverter on both sides thereof, positioned to receive flowing plastic from said first groove, said pair of second grooves extending downstream on the outer surface of the diverter;
        a divider dam positioned centrally in each of the second grooves to divide each of the second grooves into a pair of diverging channels, said dam constructed to provide a restricted clearance over its outer surface to allow a controlled amount of plastic to flow over the dam, said dam also operating to encourage the flow of plastic into the diverging channels in balanced streams; and
        a tapered annular extrusion channel positioned to receive plastic flowing from the second groove and to extrude said plastic into a tubular layer of substantially constant thickness at the extrusion die outlet.

2. An extrusion die assembly constructed to process a stream of flowing plastic from an upstream inlet to a downstream outlet, said inlet and outlet being displaced longitudinally along the axis of said assembly, as described in claim 1, wherein the tapered annular extrusion channel is formed at the downstream end of the assembly by the cooperation of a tapered portion of said inner surface of the die body and a mating tapered surface on said outer surface of the diverter.

3. An extrusion die assembly constructed to process a stream of flowing plastic from an upstream inlet to a downstream outlet, said inlet and outlet being displaced longitudinally along the axis of said assembly, as described in claim 1, further comprising a die element constructed to be assembled in the downstream end of the bore of the die body to form the outlet of the extrusion die, said die element further having an axially extending conical bore constructed to mate with a conical surface on the downstream end of the diverter to form a tapered annular extrusion channel.

4. An extrusion die assembly constructed to process a stream of flowing plastic from an upstream inlet to a downstream outlet, said inlet and outlet being displaced longitudinally along the axis of said assembly, as described in claim 1, further comprising an entrance groove communicating with the tapered annular extrusion channel and positioned to receive flowing plastic from the second groove and distribute said flow to the extrusion channel, said entrance groove encircling the full circumference of the diverter.

5. An extrusion die assembly constructed to process a stream of flowing plastic from an upstream inlet to a downstream outlet, said inlet and outlet being displaced longitudinally along the axis of said assembly, as described in claim 1 wherein the first groove extends circumferentially around 180° of the diverter and the plastic is received at the midpoint thereof.

* * * * *